United States Patent Office 3,819,774
Patented June 25, 1974

3,819,774
METHOD FOR CONTROLLING OPERATION OF A PRESS
Ulrich Eggenberger, Oberuzwil, and Josef Zehnder, Niederuzwil, Switzerland, assignors to Gebruder Buhler AG, St. Gall, Switzerland
Original application May 5, 1969, Ser. No. 821,822, now Patent No. 3,642,405. Divided and this application Feb. 22, 1971, Ser. No. 117,825
Claims priority, application Switzerland, May 9, 1968, 6,956/68
Int. Cl. B29c 3/06
U.S. Cl. 264—40
6 Claims

ABSTRACT OF THE DISCLOSURE

A method for controlling the operation of a press of the type including at least two mold parts arranged to be closed to define a mold cavity and opened relative to each other, relatively movable carrier plates each mounting a mold part, a toggle mechanism operable by a driving motor to displace one carrier plate relative to a stationary carrier plate, a joint plate engaged with toggle mechanism, beams extending between the stationary carrier plate and the joint plate, the beams constituting tension members interconnecting the stationary carrier plate and the joint plate, and a shifting mechanism for adjusting the effective length of the beams between the stationary carrier plate and the joint plate. The method of operating the press comprises setting a range of available driving power between minimum and maximum values, and during each cycle of operation measuring the peak driving power, comparing the measured power to the range of available power and responsive to the deviation of the measured power to the range of available power effecting or shifting of the beam length to restore the measured power to the range of available driving power.

BACKGROUND OF THE INVENTION

This is a division of application Ser. No. 821,822, filed May 5, 1969, now U.S. Pat. 3,642,405.

During the operation of presses having at least two mold parts to be closed, retained in closed position, and opened, it is frequently desirable to know the effectiveness of the mold closing, since the effectiveness of the mold closing is responsible for the quality of the workpiece produced by the press. This knowledge is very valuable, particularly in injection molding and in pressure casting machines, since it insures not only the quality of the workpiece but also the safety of the machine, as well as preventing accidents to operating personnel. However, the operating parameters in these presses vary in the course of time, since thermal influences, originating from the material and from the cooling of the mold, respectively, are not constant.

It has already been proposed to check operating parameters, during operation of the press, and to correct them, if necessary. One suggestion is to measure the stresses in the column or columns serving, on the one hand, to guide the mold parts and, on the other hand, to transmit the mold closing forces which manifest themselves as elongations of the columns, and to use these measured values to make corrective adjustments to the mold closing device. In these proposals, known strain gauges are used, and these strain gauges are secured on the stressed columns or guides. Alternatively, known piezoelectric gauges are arranged on the columns or guide anchor ties. In still another proposal, a gauge stick is arranged in a bore of the column or guide to be measured.

The particular disadvantage of these measuring arrangements is that the measured values, insofar as they are obtained at all in directly usable control quantities (electric, pneumatic, etc.), can be used for control purposes only after very great amplification. This is expensive in terms of apparatus and costs. In addition, the amplifiers must meet high requirements with respect to linearity.

SUMMARY OF THE INVENTION

This invention relates to presses having at least two mold parts to be closed, retained in closed position, and opened and, more particularly, to a novel method of measuring variations in the operating parameters of such presses, during operation thereof, and effecting corrective adjustments, during operation of the press, responsive to the measurements.

Tht objective of the invention is to eliminate the disadvantages of known prior art arrangements, and particularly to arrange measuring devices on the press without weakening the columns or beams, without expensive anchoring of those columns which are susceptible to trouble, and without the relatively easily vulnerable arrangement of the measuring value recorders. Since it has been found, in addition, that the presently employed measuring methods, using the mentioned measuring elements determining the elongations of the columns, beams, or guides of the press, can be substantially simplified by a new arrangement of measuring elements which determines different operating parameters of the press, the scope of the invention is directed to a wider goal than a method for operating the press. Thus, the objective of the invention is to insure a constant closing power once it has been determined, independently of the frequently changing operating parameters, like heat influences, working speed, tool life, etc.

The method of the invention serves to operate a press having at least two mold parts to be closed, retained in the closed position, and to be opened, and which are secured on oppositely moving respective mold carrier plates, with the toggle mechanism and an associated driving motor arranged between one mole carrier plate and a joint plate and serving to displace the one mold carrier plate relative to the other mold carrier plate. The method is further applicable to such a press including at least two stress absorbing beams connecting a fixed mold carrier plate and the joint plate and extending laterally of the interposed movable carrier plate, these beams being rigidly connected with the fixed mold carrier plate and with the joint plate by a shifting device for adjusting the effective length of the beams between the joint plate and the fixed carrier plate. The characteristic feature of the invention method is that, when the value of the driving power to be expended by the driving motor for closing the mold exceeds a certain limit or drops below a certain limit, or a range between an upper and lower limiting value, the shifting device is operated within a certain range of movement of the oppositely moving mold carrier plates during closing of the molds, in order to vary the effective length of the beams between the fixed carrier plate and the joint plate.

In accordance with the invention, operation of the shifting device can be effected within a constant distance. In addition, the shifting device can be driven in dependence on the difference between the measured value of the driving power and a predetermined value or range of values.

The apparatus for performing the invention method, which is arranged on the press as mentioned above, includes a dynamometer responsive to the driving power which, when the predetermined value or value range between an upper and lower limiting value is attained, is provided in a power supply line to the driving motor. At least one displacement path monitor is operatively associated with the toggle mechanism and the driving motor associated with the toggle mechanism. The dynamometer and the monitor are connected in mutual functional dependence into the control circuit of the shifting device.

In a press having a fluid pressure driving motor, a fluid pressurizing pump connected with the motor, and a fluid pressure operated switch acting as the dynamometer, the switch includes at least two switching elements for corresponding switching operations associated, respectively, with an upper limiting value and a lower limiting value.

In a corresponding arrangement for performing the invention method, the dynamometer can include elements for producing output values corresponding to the respective measured pressure, and which are supplied to the control of the shifting mechanism. In further accordance with the invention, comparisons between the theoretical values and the actual values of the pressure, during the predetermined displacement range of the mold parts, are provided for influencing the shifting mechanism.

An object of the invention is to provide an improved method of operating a press of the type including at least two mold parts arranged to be closed, to provide apparatus for performing the method.

A further object of the invention is to provide such a method in which the operating parameters of the press are continually measured and, responsive to the measurements, adjustments of the operating parameters are effected during operation of the press.

Another object of the invention is to provide such a method which are free of the disadvantages of the prior art and in which measuring devices are provided without weakening the beams or columns of the press, expensive anchoring of the beams or columns, which are susceptible to trouble, are obviated, and which operate without the relatively easily vunerable arrangement of measuring value recorders.

A further object of the invention is to provide such a method insuring a constant closing power for the mold parts which, once it has been determined, is independent of the frequently changing operating parameters such as heat influences, working speed, tool life, and the like.

A further object of the invention is to provide such a method which may be used in an injection molding machine or a pressure casting machine for the production of injection molded plastic pieces or pressure cast metal pieces.

For an understanding of the principles of the invention, reference is made to the following description of typical embodiments thereof as illustrated in the accompanying drawings.

DESCRIPTION OF THE PREFERRED EMBODIMENTS

Figure 1:
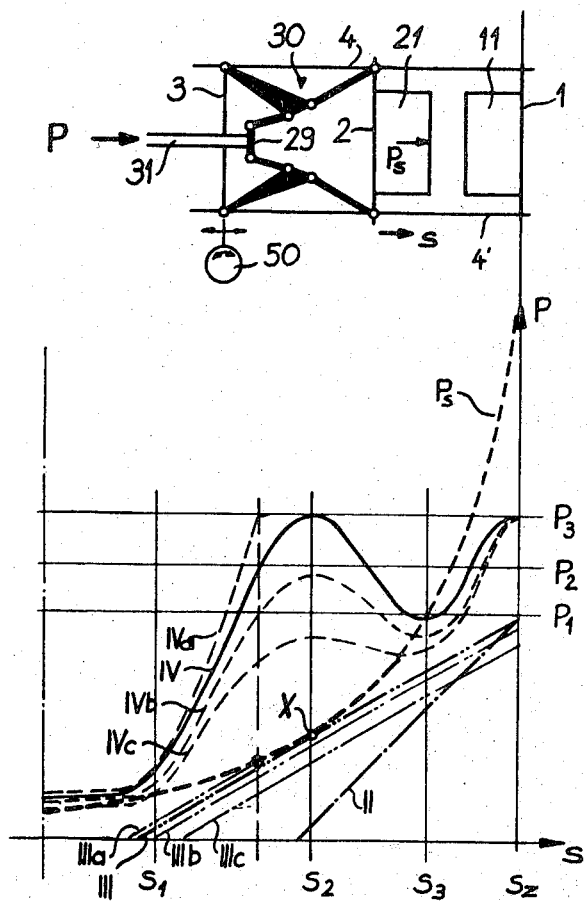
FIG. 1 is a graphic illustration of the path-force of a toggle joint pressure casting machine controlled in accordance with the invention.

The method forming the subject matter of the invention is illustrated in FIG. 1. FIG. 1 shows schematically, in its upper portion, the mold closing device with the toggle joint mechanism and, in its lower portion, graphi- cally illustrates various characteristic quantities. In the strictly schematic representation of a pressure casting machine in FIG. 1, a stationary mold carrier plate is illustrated at 1, a moving mold carrier plate at 2 and a joint plate at 3, these plates being arranged along the force transmitting beams 4 and 4'. Stationary mold carrier plate 1 carries mold part 11, and movable mold carrier plate 2 carries a second mold part 21. The toggle joint system 30 is interposed between movable mold carrier plate 2 and joint plate 3, and is actuated by a driving element or motor 31. A shifting mechanism 50, operable to adjust the distance between stationary mold carrier plate 1 and joint plate 3, is illustrated schematically.

In the diagram, the displacement path of movable mold carrier plate 2 toward stationary mold carrier plate 1 is designated S, while the mold closing power necessary for its displacement is designated $P_s$. The driving power of the mold closing device is designated P.

The hyperbola $P_s$ represents the curve of the mold closing power, during constant utilization of the maximum available driving power $P_3$, through the mold closing operation within the path extending from the abutment of the mold parts 11 and 21, at $S_1$, to the final closing of the mold at the position $S_z$. The direction and the shape of the curve depend, to a great extent, on the construction of the toggle joint mechanism. The mold closing power $P_s$, which increases theoretically toward the infinite, is limited, in the right part of the diagram, to a finite value due to various mechanical influences such as friction, deformation, braking, piston stroke, etc. The power P of the driving motor is represented on a different and larger scale.

The line II illustrates the increase of the column or beam elongation without any additional elongation originating from other elements, as a function of the mold closing path. More important, however, is the characteristic III which illustrates the increase of the elongations and contractions in the entire stressed system, deformations in the joint system, in the mold carrier plates, etc., being also taken into consideration, in addition to the elongations of the columns or beams.

Interest is centered mainly on the optimum operation of the machine during the mold closing operation and the mold closure retaining operation, using the available driving power. This means, primarily, that there are no great reserves in the toggle joint mechanism with respect to the rated capacity of the columns or beams to withstand stress, but that this stress is primarily in the range of the permissible material stress. This case exists when the applied mold closing power just approaches the stress limits of the force transmitting elements which, in the present case, are the force transmitting beams 4 and 4'.

This stress is illustrated in FIG. 1 as occurring when the characteristic III is, at a point X, tangent to the curve $P_s$ of the mold closing power. In this path section $S_2$, the entire or available driving power P is required to move the toggle joint system 30. To the left and right of this utilization of the maximum driving power, the curve IV of the driving power drops relatively sharply, which suggests that there is a reserve between the available driving power and the required driving power, since curve IV is considerably below the maximum value $P_3$ determinant for one case.

In the path section $S_1$, the mold parts 11 and 12 bear on one another and, from this time on, are forced increasingly against each other. In the path section $S_3$, there is another saddle in curve IV so that, at this point, there again exsists a considerable power reserve between the available driving power and the required driving power. From this point on, the machine is stressed increasingly up to the maximum locking power, the mold being finally closed in the path section $S_z$ with the toggle joint system being brought nearly into the stretched dead center position. There is obtained for the given driving power $P_3$, that is achieved at the end of the closing operation, the greatest possible elongation of the force transmitting beams 4, 4', and the machine is thus best utilized.

It should be pointed out that this minimum value of curve P is actually lower and displaced greatly to the right, compared to the represented curve, which permits, however, distinguishing better between the various load cases, due to a certain distortion. The second rise of curve P can be accounted for by the fact that the theoretical curve $P_s$ of the mold closing power is no longer correct at this point, because it is, at first, reduced in time by a braking effect with the element 31 at the end of the closing path, and because the driving element 31 abuts a stop so that the dead center of the toggle joint system 30 is not quite reached.

Deviation from this substantially optimum utilization of the machine in accordance with the curves III and IV result from the curves IIIa, IIIb and IIIc, as well as the curves IVa, IVb, and IVc. Because the values are too high in curves IIIa and IVa, it can be seen that the mold can no longer close, since the mold closing power resulting from the maximum available driving power can no longer effect an increase in the column elongation because curve IIIa intersects curve $P_s$ in advance of the line $S_2$. Within the path from $S_1$ to $S_3$, the maximum available power value $P_3$ would be exceeded, as is illustrated by curve IVa.

This operation is extremely dangerous, since there is a risk of column or beam rupture at the end of the mold closing movement, or at least permanent deformations of the columns can be expected, for example, by a careless increase of the maximum value $P_3$ up to X in order to overcome the column elongation.

However, if the machine is operated by the toggle joint system in accordance with the curves IVb and IVc, and corresponding to the stress characteristics IIIb and IIIc, the driving power within the displacement path from $S_1$ to $S_3$ is below the minimum value $P_2$ to be attained in accordance to prediction, or even below a lower limiting value $P_1$. In these ranges, the machine is operated rather uneconomically, and there is a great risk that the mold will burst open during the injection of the liquid plastic or fluid metal, so that the workpiece produced therein will be defective and the sputtering hot material may cause serious injuries to operating personnel. This operating state, therefore, must be corrected by increased tension, that is, displacement of the joint plate 3 toward the stationary mold carrier plate 1 along the force transmitting beams 4 and 4'.

It should be pointed out, however, that there are cases where the entire available mold closing power machine may not be used. For example, if a mold originally designed for use in a smaller machine is used on a larger machine, the entire available mold closing power may not be used. In this case, too, the invention offers important advantages since it permits controlling exactly the maximum admissible mold closing power and by simple means.

The essential feature of the mold closing monitoring and correcting procedures of the invention consists in determining the peak of the mold closing power, appearing within a certain range of the mold closing path at both sides, before the final closing of the mold, and to act correspondingly on the adjustment in either a tightening or a loosening sense. In other words, this means that a certain power of the driving system actuating the toggle joint mechanism is determined within a certain displacement path of the toggle joint mechanism, and that a correction is made, in case of deviations, in the distance responsible for it, between the stationary mold carrier plate and the joint plate connected thereto by the beams, or in the spacing of the two mold carrier plates with the dead center of the toggle joint mechanism in closing position.

Figure 2:
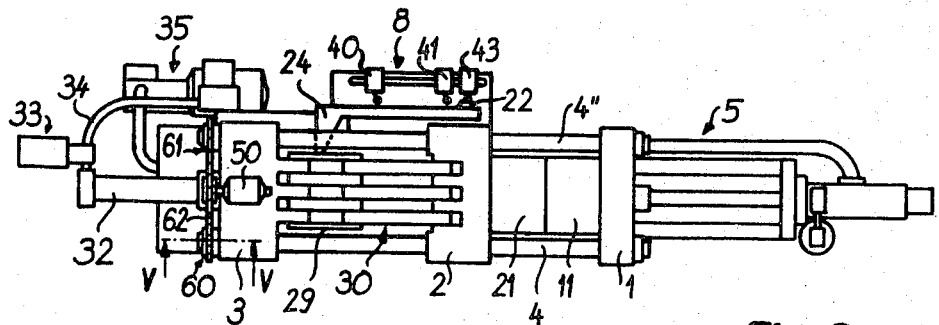
FIG. 2 is a plan view of a pressure casting machine illustrating the most important elements thereof.
Figure 3:
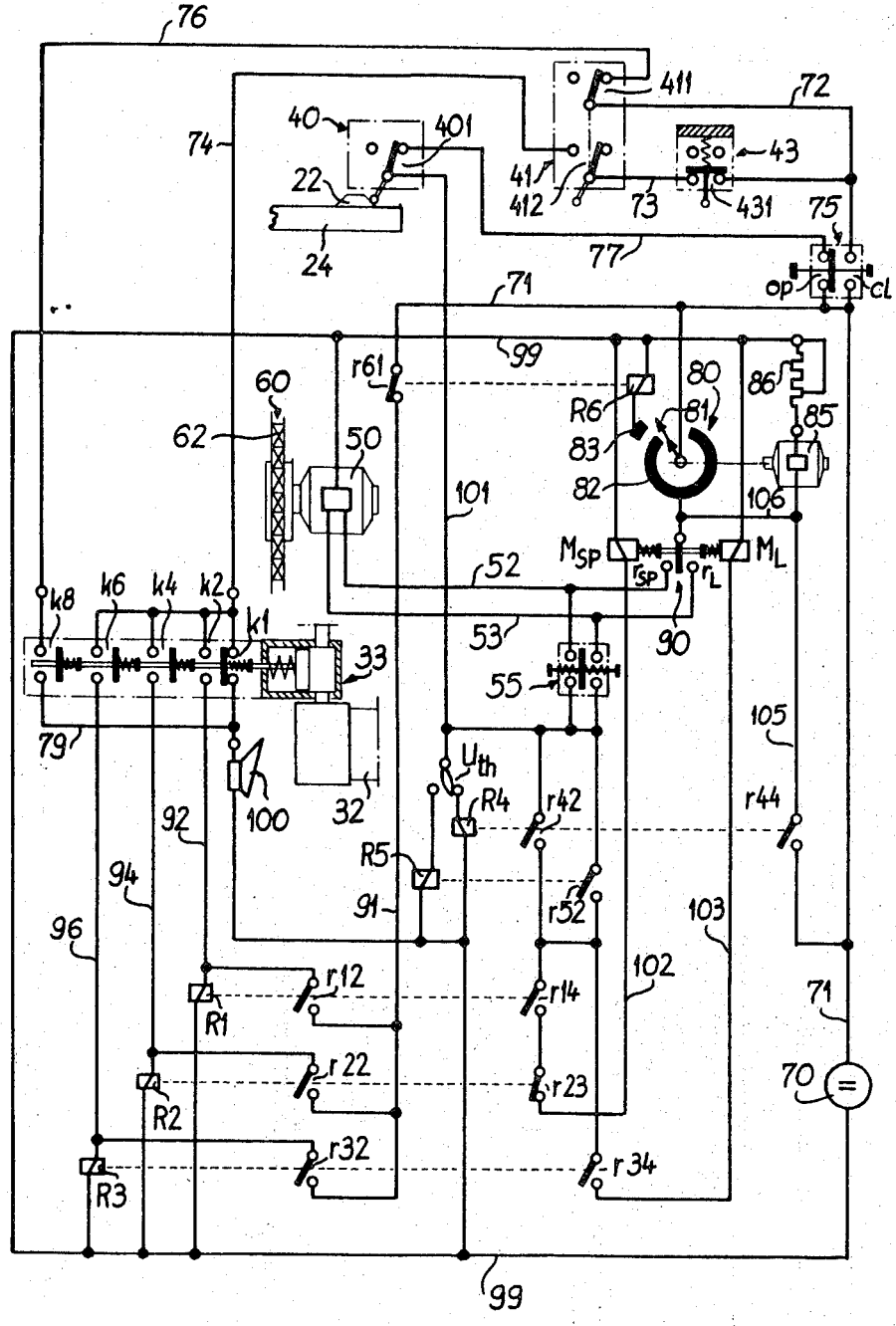
FIG. 3 is a schematic wiring diagram of a first embodiment of control means for performing the invention method.

A first arrangement for performing the method of the invention is illustrated in FIGS. 2 and 3, in which a pressure casting machine includes mold parts 11 and 12 secured on the respective mold carriers 1 and 2. Beams 4 and 4' extend from mold carrier 1 through mold carrier 2 to joint plate 3. Toggle joint mechanism 30 is arranged between joint plate 3 and mold carrier plate 2. Plate 3 carries a hydraulic cylinder 32 as a driving motor of the toggle mechanism 30, and a hydraulic pressure supply arrangement 35 supplies motor 32 with power through a line 34 to which is connected a dynamometer 33. Joint plate 3 also carries a shifting mechanism comprising a servo motor 50 connected by gearing 60 with nuts 61 mounted in joint plate 3 for rotation and relative displacement on the force transmitting beams 4 and 4'. A control cam 22 on a carrier 24 is operatively associated with the joint head of toggle mechanism 30, and the machine base carries a displacement path monitor 8 comprising three limit switches 40, 41 and 43 which are operable by cam 42. Stationary mold carrier plate 1 is operatively associated with the mold charging unit 5.

Displacement path monitor 8, comprising the limit switches 40, 41 and 43, and dynamometer 33, are connected with step motor 50 in the gearing 60 for the automatic determination of the operation of the machine and for any correction of the distance between joint plate 3 and stationary mold carrier 1 arranged at opposite ends of the force transmitting beams 4 and 4', and thus of the distance between the mold carrier plates 1 and 2. They are connected together with additional elements to form a control device.

Referring more particularly to FIG. 3, a reversing switch 75, a relay front contact $r44$, a relay back contact $r61$, and a double tap 81 of a commutator having two contact segments 82 and 83, are connected to a source of D.C. potential 70 through a conductor 71. From the contacts $c1$ of reversing switch 75, a conductor 72 extends both to limit switch 43 and to contacts 411 of limit switch 41. The second contacts $op$ of reversing switch 75 are connected by conductor 77 to contacts 401 of limit switch 40. The back contacts 431 of limit switch 43 are connected by conductor 73 to the contacts 412 of limit switch 41, and a conductor 74 connects contacts 412 commonly to contacts $k1$, $k2$, $k4$ and $k6$ of dynamometer 33. A conductor 76 connects contacts 411 of limit switch 41 to front contacts $k8$ of dynamometer 33 which are operable to complete a circuit, from D.C. potential source 70, to an alarm horn 100 through a conductor 79. Horn 100 is also connected to back contacts $k1$ of dynamometer 33, and is further connected to a return line 99 leading to source 70.

The front contacts $k2$, $k4$ and $k6$ of dynamometer 33, which are commonly connected by conductor 74 to front contacts 412 of limit switch 41, are connected individually, through respective conductors 92, 94 and 96, to return line 99. Conductors 92, 94 and 96 lead to respective relay coils $R_1$, $R_2$ and $R_3$, and are connected through associated front contacts $r12$, $r22$, $r32$ and a conductor 91 to the back contact $r61$, to serve as hold circuits for the respective relays. A conductor 101 connects contacts 401 of limit switch 40 to a thermal delay switch $U_{th}$ having contacts connected, respectively, to first terminals of relay coils R4 and R5 whose second terminals are connected to return conductor 99. Front contacts $r42$ and $r52$ of relays R4 and R5, respectively, are connected to conductor 101 and are interconnected with each other to a series circuit including a front contact $r14$ of relay R1 and a back contact $r23$ of relay R2. A conductor 102 extends from contact $r23$ to one terminal of a tightening solenoid $M_{SP}$ whose other terminal is connected to return conductor 99. In parallel with conductor 102, a front contact $r34$ of relay R3 is connected, in the further power measuring circuit 96–99, into conductor 103 connected to one terminal of loosening solenoid $M_L$ whose other terminal is connected to common return conductor 99.

A driving motor 85 for commutator 80 is energized through a front contact $r44$ of relay R4, which front contact is in series in a conductor 105 leading from conductor 71, connected to D.C. potential source 70, to one terminal of motor 85. The opposite terminal of motor 85 is connected through an adjustable speed controlling series resistance 86 to common return conductor 99. A bridge 106 connects conductor 105 to the inner commutator strip 82, and is also connected to the movable contact of reversing switch 90 for tightening and loosening of the adjusting nuts. Respective conductors 52 and 53 connect the reversing switch contacts $r_{SP}$ and $r_L$ to servo motor 50 of the shifting mechanism, which servo motor is also connected to common return conductor 99. The outer commutator segment or strip 83 is very short and, between it and common return conductor 99, there is connected a relay coil R6 which operates the back contacts $r61$. A reversing switch 55 is connected between conductors 52 and 53 and conductor 101 which leads to the contacts 401 of limit switch 40. Reversing switch 55 is normally in its center or off position.

The operation of the arrangement shown in FIG. 3 will now be described. Assuming that initially D.C. potential source 70 is disconnected, all the components of the circuit are in the represented positions. When D.C. potential source 70 is connected, potential is applied to a circuit including contacts $op$ of reversing switch 75, conductor 77, contacts 401 of limit switch 40, conductor 101, thermal lag switch $U_{th}$, and relay R4. Relay R4 is thus transferred so that front contacts $r42$ and $r44$ are closed and driving motor 85 of commutator 80 is thus immediately energized. Motor 85 begins to rotate with a fixed speed determined by the adjustment of resistance 86. Tap 81 of commutator 80 engages inner commutator segment 82, but such engagement does not affect either the further course of the rotation of motor 85 nor any operation of shifting mechanism 50–60.

After a certain time interval, thermal lag switch $U_{th}$ has been heated sufficiently that it opens the connection to relay R4 and closes the connection to relay R5. Thus, front contacts $r42$ and $r44$ are opened, and front contacts $r52$ of relay R5 are closed. However, since front contacts $r14$ and $r34$ are open, this operation has no further effect. Front contacts $r44$, which are now open, also have no influence, because motor 85 continues to run as it is supplied with current through inner commutator segment 82 and bridge 106. When tap 81 engages outer commutator segment 83, relay R6 is energized briefly and back contact $r61$ is opened. After a further short rotation of driving motor 85, double tap 81 disengages both commutator segments 82 and 83, motor 85 is deenergized and back contact $r61$ or relay R6 is re-closed. Only thermal delay switch $U_{th}$ remains in its new position and maintains relay R5 energized so that front contacts R52 also remain closed. However, this has no further effect.

If reversing switch 75 is switched from its opened position $op$ into its closed position $c1$, which occurs upon the starting signal for mold-closing movement from the machine control (not shown), thermal delay switch $U_{th}$ is deenergized and, after a cooling period, returns to its represented back position. Due to the displacement of mold carrier plate 2, and thus of control cam 22, contacts 401 of limit switch 40 are opened. During movement of mold carrier plate 2 through the distance from the fully opened position of the mold to the reversing switch 41, which movement corresponds substantially to the switching path to point $S_1$ of FIG. 1, nothing happens in the control.

When the operation proceeds past point $S_1$, limit switch 41 is reversed to open its contacts 411 and close its contacts 412. Thereby, conductor 74 is connected to the D.C. potential source 70 and conductor 76 is disconnected therefrom. At the point $S_1$, the pressure in dynamometer 33 begins to increase. Even before the operation reaches point $S_1$, the movable element of the dynamometer should be moved from its rest position to open the contacts $k1$, in normal operation. However, if this does not occur, the machine is set completely wrong, and alarm horn 100 is energized over the circuit now extending from D.C. potential source 70 through the circuit including conductor 71, contacts $c1$ of reversing switch 75, contacts 431 of limit switch 43, contacts 412 of limit switch 41, conductor 74 and contacts $k1$, as well as the conductor 79 and 99 forming the return to D.C. potential source 70. Alarm horn 100 warns that a readjustment of the machine is necessary.

In the normal operation of the machine, which is operation with a correct setting, the back contacts $k1$ of dynamometer 33 have opened before limit switch 41 is actuated by control cam 22 so that, when limit switch 41 is reversed, alarm horn 100 can no longer be energized. If the pressure in the pressure gauge constituting the dynamometer 33 attains a value which is either greater than or equal to $P_2$, but less than $P_3$, during movement of cam 22 from limit switch 41 to limit switch 43, which corresponds to movement from path section $S_1$ to path section $S_3$ of FIG. 1, the two front contacts $k2$ and $k4$ of dynamometer 33 are closed while the other two front contacts $k6$ and $k8$ remain open. Relay coils R1 and R2 are thus energized and immediately held through their associated front contacts $r12$ and $r22$, as well as through the back contacts $r61$ of relay R6.

When control cam 22 passes by limit switch 43, the back contacts 431 of this switch are opened and the mold parts 11 and 12 are in the closed position. Although the current supply to relay coils R1 and R2 through limit switches 41 and 43 is now interrupted, these two relays remain energized through the respective self-holding front contacts $r12$ and $r22$. Opening of limit switch 43 now permits dynamometer 33 to rise above the tolerance range and thus to energize the alarm horn 100 through contacts $k8$ without any effect on front contacts $k6$. This is the case when the maximum mold closing power $P_3$ has been attained.

By switching reversing switch 75 from contacts $c1$ to contacts $op$ for the mold opening movement, which switching coincides normally with the signal from the machine control or is provided by the latter, mold carrier plate 2 moves away from stationary mold carrier plate 1, mold parts 11 and 12 are opened, and ejection of the finished workpiece is permitted. The pressure in the pressure gauge constituting dynamometer 33 collapses, and front contacts $k6$, $k4$ and $k2$ are opened again and back contacts $k1$ are closed.

When the limit switch 40 is reached by cam 22, switch 40 is operated to close its contacts 401. Relay R4 is energized immediately through thermal delay switch $U_{th}$, and the two front contacts $r42$ and $r44$ are closed. Motor 85 of commutator 80 again begins to run. Due to energization of relays R1 and R2, which are still self-held, front contacts $r14$ remain closed and back contacts $r24$ remain open, so that tightening magnet $M_{sp}$ is not energized. However, since relay R3 also remains deenergized, its two front contacts $r32$ and $r34$ are open and loosening magnet $M_L$ also is unenergized so that reversing switch 90 remains in its center position.

When double tap 81 engages commutator segment 82, motor 85 of commutator 80 has its energizing circuit held closed through bridge 106 so that the motor 85 continues to operate. In the meantime, thermal switch, $U_{th}$ switches into the position energizing relay R5, which results in opening of front contacts $r42$ and $r44$ of relay R4, as well as in closing of front contacts $r52$. This has no effect on the other functions in this operation. Due solely to the holding circuit closed through inner commutator segment 82, motor 85 continues to run until tap 81 disengages commutator 82, and the motor is then deenergized. Shortly before stopping of the motor, relay R6 is instantaneously energized and back contacts $r61$ open to break the holding circuit for relays R1 and R2. Thus, the control device is again in a starting position.

If, between actuation of limit switches 41 and 43 during a mold closing operation, only the back contacts $k1$ of dynamometer 33 open and only front contacts $k2$ close, so that only relay R1 is energized so that its front contacts $r12$ and $r14$ are closed, tightening solenoid $M_{SP}$ of reversing switch 90 is energized, after the mold 11-21 has opened, over a newly established energizing circuit. This circuit extends from D.C. potential source 70 through reversing switch 75, contacts 401 of limit switch 40, conductor 101, thermal delay switch $U_{th}$, relay winding R4 and return conductor 99. Relay R4 closes its front contacts $r42$ and $r44$. Tightening solenoid $M_{SP}$ is then energized through closed front contacts $r42$ and $r14$, closed back contacts $r23$ and conductor 102. Reversing switch 90 thus closes its contacts $r_{SP}$. Simultaneously, motor 85 begins to turn commutator tap 80, motor 85 being energized through the closed front contacts $r44$.

Servo motor 50 of the shifting mechanism is energized through bridge 106, reversing switch 90 and conductor 52, so that joint plate 3 is moved along beams 4 and 4', connected to stationary mold carrier plate 1, through the gear connection 60 and the nuts 61. After thermal delay switch $U_{th}$ has been reversed, the front contacts $r42$ and $r44$ of relay R4 are opened, and front contacts $r52$ of relay R5 are closed, so that the energizing circuit for solenoid $M_{SP}$ of reversing switch 90 remains closed. Motor 85, which is energized over bridge 106, operates commutator 80. When tap 81 engages outer commutator segment 83 of commutator 80, relay R6 is energized and back contacts $r61$ are opened, and thus the holding circuit of relay R1 is interrupted. Relay R1 therefore opens its front contacts $r12$ and $r14$, which effects deenergization of tightening solenoid $M_{SP}$ so that reversing switch 90 returns into its center position and interrupts energization of shifting mechanism 50. When tap 81 of commutator 80 has disengaged both commutator segments 82 and 83, the holding circuit of motor 85 is interrupted and motor 85 stops. Thermal delay switch $U_{th}$ remains, due to its heating, in its position.

However, when the driving power attains the value $P_3$ within the path section $S_1$–$S_3$, by actuating the toggle mechanism for closing the mold, the first three front contacts $k2$, $k4$, and $k6$ of dynamometer 33 are closed. The other functional steps of limit switches 40, 41 and 43, as well as of thermal delay switch $U_{th}$, remain the same. In addition, all three relays R1, R2 and R3 are energized and remain energized through the holding circuits closed by the respective contacts $r12$, $r22$ and $r32$. The respective front contacts $r14$ and $r34$ of relays R1 and R3 are thus closed, and the back contacts $r23$ of relay R2 are opened.

With the mold open again, and the press receiving the signal for opening the mold, in this operating state, automatically from the machine control and preferably on the basis of the dynamometer result, that is, over an additional front contact of relay R3 acting on the machine control, limit switch 40 is reclosed so that relay R4, having front contacts $r42$ and $r44$, is energized through thermal delay switch $U_{th}$. Front contacts $r42$ and $r44$ are closed, and a circuit is completed through closed front contacts $r34$ to loosening solenoid $M_L$ to energize the latter and switch reversing switch 90 to close its contacts $r_L$. Shifting mechanism 50-60 begins to run. Driving motor 85 of commutator 80 is also energized and closes a holding circuit through tap 81, commutator segment 82 and bridge 106.

During delayed switching of thermal delay switch $U_{th}$, relay R5 is energized instead of relay R4, and thus the circuit is changed from front contacts $r42$ to front contacts $r52$, the current supply to driving motor 85 of commutator 80 is opened at front contacts $r44$, and is maintained only through the holding circuit. As long as tap 81 engages segment 82 of commutator 80, which can be determined by adjusting resistance 86, shifting mechanism 50-60 shifts the position of joint plate 3 away from stationary mold carrier plate 1. After one revolution of tap 81 of commutator 80, all the relays R1–R3 are deenergized, and shifting mechanism 50 and motor 85 of commutator 80 are also deenergized. However, current continues to flow from back contacts 401 of limit switch 40 through the thermal contact of delay switch $U_{th}$ to relay R5, whose front contacts $r52$ remain closed.

It should be pointed out at this time that the frequency of the loosening steps is limited by a suitable circuit, for example, a counting circuit. This is due to the possibility that after a casting edge has been formed and has not been removed from the workpiece, an excessive mold closing power is indicated erroneously by the dynamometer during the next mold closing, because of this casting edge clamped between the two mold parts. Consequently, the mold is opened, the shifting device is operated in a loosening direction and the mold is reclosed, this time prestressed in the desired range. However, because of the gap that now exists, in practice, between the mold parts, and which is due to the casting edge, additional casting material will enter this gap during the next charge, and probably will not be removed during the next ejection of the workpiece, particularly because of the growth on the older casting edge. With repeated corrections of the mold closing unit, the operating personnel is in very great danger. Therefore, the number of substantially successive loosening steps must be limited and, when this limiting value is attained, an alarm must be sounded, the press must be stopped, or both. The starting position for this counting is the start of the operation of the press signal to the control as correct, for example, by a signal "operation automatic" following the signal "setting automatic."

If joint plate 3 should be too close to stationary mold carrier plate 1, for some reason, and thus the mold closing pressure exceed the maximum value $P_3$ before cam 22 reaches limit switch 41, that is, before the movement reaches the path section $S_1$ of FIG. 1, alarm horn 100 will be energized due to the connection from reversing switch 75 through back contacts 411 of limit switch 41 and the front contacts $k8$ of dynamometer 33 which latter have already been closed by the excess pressure. The press must be opened immediately, which is likewise advantaegously effected automatically by the machine control. In this case, it is necessary that the shifting can also be effected manually and independent of the automatic shifting.

For this purpose, reversing switch 55 is connected between conductor 101, extending from limit switch 40, and conductors 52 and 53 leading to shifting mechanism 50-60. It is only when the mold is opened that it is possible to loosen the mold tension, by throwing reversing switch 55 to the right, or to increase the tension on the beams, by turning reversing switch 55 to the left.

Despite the relatively simple construction of the control device, it is possible, due to the effective operation of the press, to keep the latter in the optimum working range and thus to eliminate the risk of defective pieces to a great extent. In this embodiment of the control, the description was started from the consideration that each correction is effected step-by-step by a certain fixed amount. Even though the control is effected with electromechanical elements, such as relays, thermal delay switches, reversing switch, etc., it is logical, in the present state of technology, to replace the latter, if necessary, by a strictly electronic, transistorized control device, or other device provided with stationary logic elements.

In certain cases, it may be advisable to effect any shift, for correcting the position of joint plate 3, and thus for correcting the mold closing power to be expended, in direct dependence on the actual value deviation from a given theoretical value, that is, to effect the correction not by a certain amount, but by a quantity associated with the deviation. A control device for effecting this is illustrated in FIG. 4.

Figure 4:
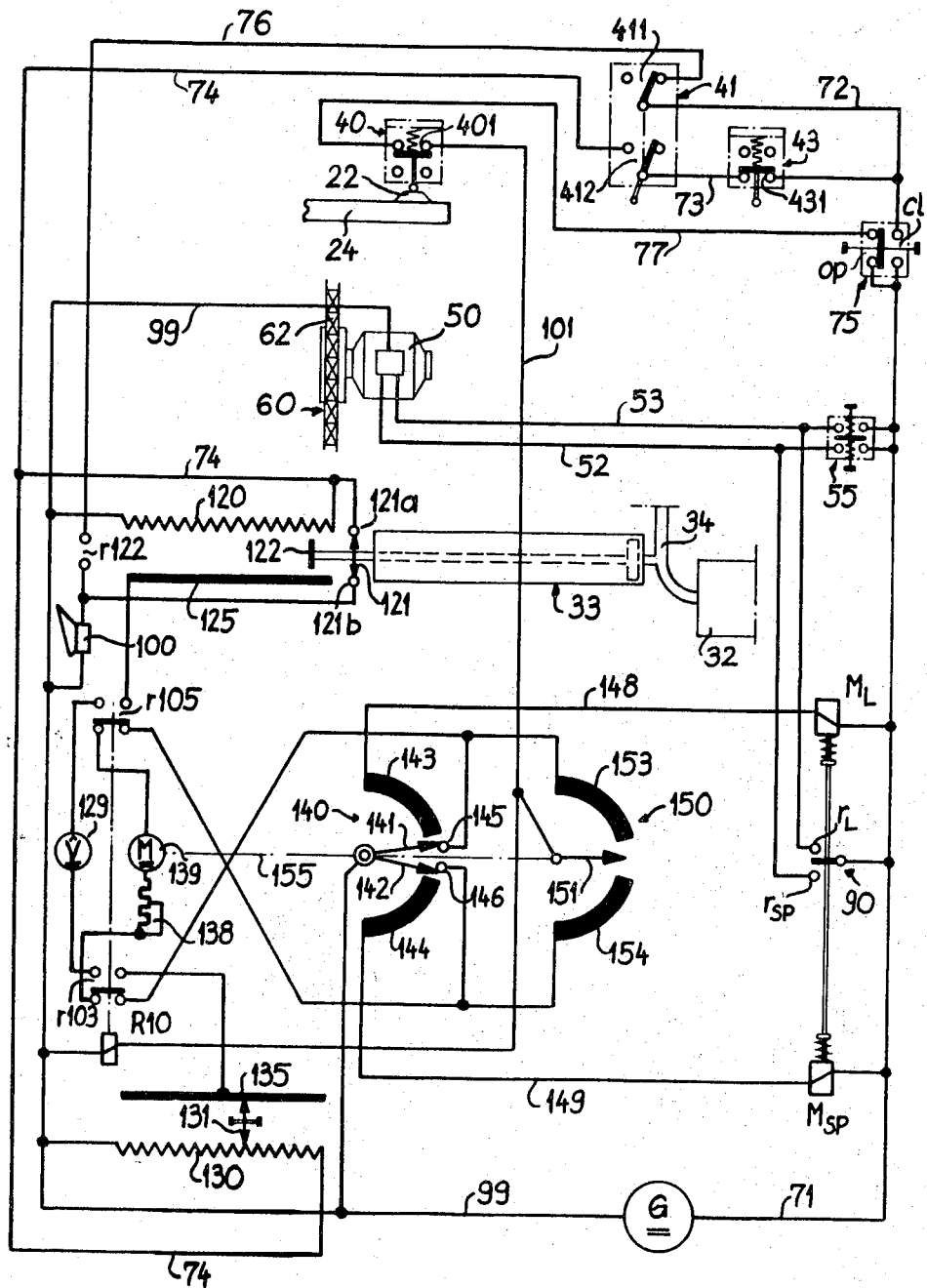
FIG. 4 is a schematic wiring diagram of a second embodiment of control means for performing the method of invention.

Referring to FIG. 4, limit switches 40, 41 and 43, as well as reversing switches 55 and 75, connected to a source of D.C. potential, are still used. In addition, a tightening solenoid $M_{SP}$ and a loosening solenoid $M_L$, with the associated reversing switch 90, are connected to potential source 70, indicated in FIG. 4 as G. Conductors 52 and 53 extend from the respective contacts $r_{SP}$ and $r_L$ of reversing switch 90 to shifting mechanism 50-60, which is also connected to common return line 99. Dynamometer 33 is provided with a double tap 121 and with a circuit closure 122. Tap 121 is provided for establishing a connection between two contacts 121a and 121b, on the one hand, and for determining a certain resistance value along a measuring resistance 120. Tap 121, when engaged with measuring resistance 120, is also engaged slidingly with an elongated contact strip 125. Closure 122 of dynamometer 33 serves, in certain cases, to close contacts r122 in conductor 76 connected to the contacts 411 of limit switch 41, for energizing alarm horn 100 which latter is also connected to contact 121b. The second contact 121a is connected to measuring point resistor 120 and also to front contacts 412 of limit switch 41.

In order to determine the theoretical value, a reference resistor 130, comprising a resistance wire, an adjustable tap 131 and an elongated contact 153, is provided. Reference resistor 130 can be adjusted to a certain value, and the resistance wires of measuring point resistor 120 and reference resistor 130 are connected in parallel. A relay R10, with reversible contacts 103 and 105, is connected with front contacts 401 of limit switch 40 through a conductor 101. The transfer contacts r103 and r105 of relay R10 are connected, on the one hand, to contact strip 135 and to contact strip 125 and, on the other hand, to a measuring and setting device 129 responding to the maximum values of the applied voltages. The rest contacts 103 and 105 of relay R10 are connected to contacts 145 and 146, respectively, in a first commutator 140 having two maximum pointers 141 and 142, and are also connected with the commutator segments 153 and 154, respectively, of a second commutator 150 having its shaft in common with that of commutator 140. In addition, these rest contacts are connected to each other through a return motor 139 which is in series with an adjustable speed setting resistor 138.

The common shaft 155 of the two commutators has fixed thereto the rotor of return motor 139, the maximum pointers 141 and 142, and the tap 151. Maximum pointers 141 and 142 of first commutator 140, which are designed as taps, are connected with common return line 99 leading to d.c. potential source G. Tap 151 of second commutator 150 is connected to conductor 101 extending from limit switch 40 to relay coil R10. The commutator segments 143 and 144 of first commutator 140 are individually connected, by respective conductors 148 and 149, with tightening solenoid $M_{SP}$ and loosening solenoid $M_L$, respectively, of reversing switch 90.

The control device shown in FIG. 4, for operating a toggle joint press, permits a procedure which will now be described. Movement of reversing switch 75 from the opened position op into the closed position c1, occurring at the start of the mold closing movement, and the subsequent actuation of limit switches 40, 41 and 43, takes place exactly as described above. Initially, standard resistance 130 is set, by adjustable tap 131, to a predetermined theoretical value. With continuing mold closing movement, dynamometer 33 and tap 121 thereof are moved to the left. In normal operation of the press, tap 121 of dynamometer 33 is moved, into a corresponding position, in the range between path positions $S_1$ and $S_3$, that is, between actuation of limit switch 41 and actuation of limit switch 43, corresponding to the setting of reference resistance 130. Consequently, there is no voltage difference between taps 121 and 131, device 129 indicating the peak value remains in the rest position, and the associated maximum pointers 141 and 142, of commutator 140, and tap 151, of commutator 150, are not moved.

When the mold is reopened, there are no currents flowing from maximum pointers 141 or 142 through the associated commutator segments 143 or 144, respectively, and no current flows to return motor 139. This latter has been connected, by reversing switches r103 and r105 switched by limit switch 40 which energizes relay R10. Furthermore, no current flows to tightening solenoid $M_{SP}$ or to loosening solenoid $M_L$. Shifting mechanism 50, which is connected by gearing 60 with adjusting nuts 61 on joint plate 3, is not actuated.

However, if tap 121 of dynamometer 33 is brought into a position differing from the position of tap 131 of reference resistance 130, a voltage difference exists between resistors 120 and 130. Measuring and setting device 129 is shifted into a corresponding position, and one of the maximum pointers 141, 142 of first commutator 140, as well as tap 151 of second commutator 150, is moved to engage the corresponding commutator segments 143 and 153, or 144 and 154, respectively. During opening of the mold, taps 141 or 142 and tap 151 remain in the positions attained thereby. In addition, the tap 141 or 142 which is not moved remains in contact with contact 145 or 146, as the case may be.

With the closing of limit switch 40 in the opened position of the press, relay R10, having the reversing contacts r103 and r105, is energized. A current thus flows from conductor 101, on the one hand, through tap 151 of second commutator 150 and one commutator segment 153 or 154, opposite to the measuring direction, and through return motor 139 and series resistance 138, so that return motor 139 is actuated in a correcting sense as long as there is contact between tap 51 and the respective commutator segment 153 or 154. In parallel with this circuit, a current flows from conductor 71 through one of the solenoids $M_{SP}$ or $M_L$ to the associated commutator segment 143 or 144 of first commutator 140, from which the circuit is closed over the associated tap 141 or 142 to the common return line 99.

This excitation of one of the tightening or loosening solenoids $M_{SP}$ or $M_L$ maintains reversing switch 90 closed in one of the two positions $r_{SP}$ or $r_L$, respectively. The shifting mechanism thus is actuated in either an opening or a closing sense by the circuit G-71-90-52 or 53-50-99-G, respectively. At the moment when a tap 141 or 142, and tap 151, are moved back into the zero position and thus are no longer in engagement with commutator segments 143 and 153 or 144 and 154, the respective tightening or loosening solenoid $M_{SP}$ or $M_L$ is deenergized, reversing switch 90 is returned to the central neutral position, shifting mechanism 50-60 is deenergized and return motor 139 is deenergized.

If the range of dynamometer 33 within the determined path section $S_1$ to $S_3$ of FIG. 1, which is controlled by limit switches 41 and 43 and which effects the automatic tightening or loosening of the toggle joint system, is either not reached or is exceeded, contacts 121a and 121b remain interconnected by tap 121, or contacts 122 are closed by contact closure 122, which results immediately in energization of alarm horn 100 to provide a signal. In order to correct such a wrong setting, a manually operated reversing switch 55, which is normally in a central neutral position is provided to connect conductors 71 to conductors 52 and 53 leading to shifting mechanism 50-60.

The design of the control device as shown in FIG. 4 permits, at all times, correction of the mold closing power by the necessary amount. That is, a wrong setting or a change in the operation of the press is always effected by a single correction and back into the theoretical range. In contrast to the first embodiment of FIG. 3, this represents, in most cases, an acceleration of the correction, since the press does not open and close several times until it is set in the desired range.

In order to shift joint plate 3, and thus the entire toggle joint mechanism 30 with the mold carrier 32 connected thereto, it is known to provide nuts 61 supported in joint plate 3, these nuts being displaceable by rotation on threaded portions 204 of beams such as 4. It is also known to drive several nuts 61, arranged on several beams 4, 4' and 4", by a common driving element connected by gearing to the nuts, for example, a servo motor 50, a hydro motor, etc., which is driven by a large gear (not shown) which is in engagement with all the driven elements, or by common driven worms engaged with worm gears (also not shown). In view of the fact that the mold, comprising the mold parts 11 and 21, frequently must be secured unilaterally on the mold carrier plates 1 and 2, it is necessary to vary the positions of nuts 61 on the various beams 4, 4' and 4". This requires special devices in the transmission from the central driving system 50–60 to the individual nuts 61.

Figure 5:
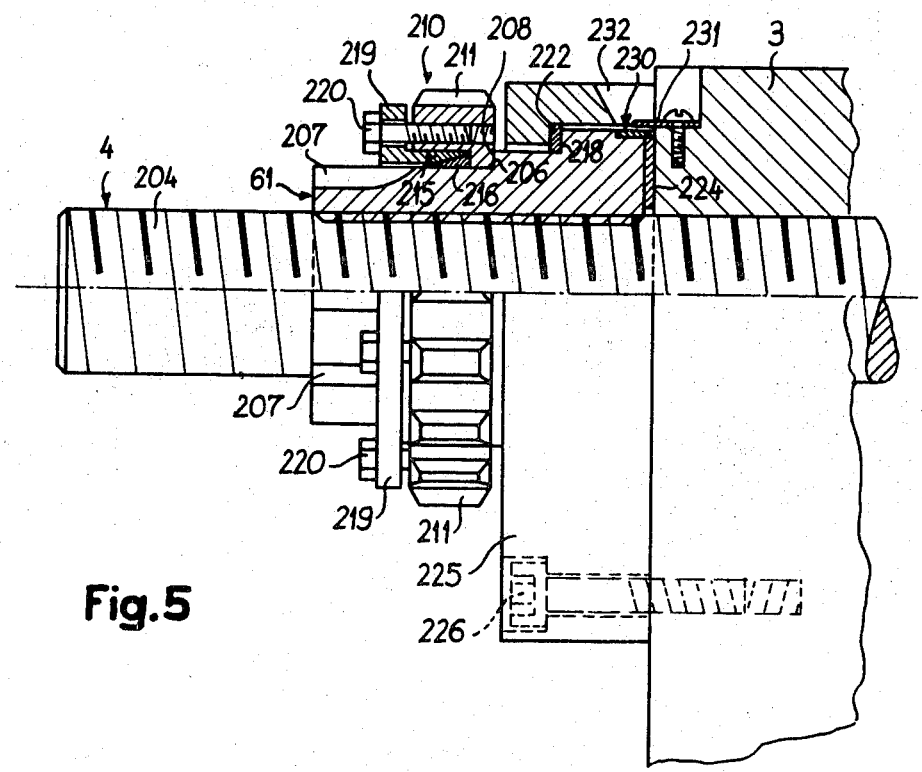
FIG. 5 is an elevation view, partly in section, illustrating the connection of a nut, threaded on a beam, with a driving gear.

An advantageous arrangement for effecting this is shown in FIG. 5, in which each beam 4 is displaceably threaded through a respective nut 61. A first substantially cylindrical section 206 of each nut 61 is formed with a groove, or with a plurality of slots, 207 for receiving the hook of hooked wrenches. Adjoining cylindrical section 206, each nut has a shoulder 208 against which there abuts a ring gear 210 having teeth 211. In order to tighten ring gear 210 with nuts 61, two annular clamping elements 215 and 216 are arranged on cylindrical section 206, these elements having oppositely directed wedge cross sections whose sloping surfaces bear against each other. A clamping ring 219 is provided for tightening annular clamping elements 215, 216, and is drawn toward ring gear 210 by screws 220 threaded into ring gear 210. Tightening of screws 220 results in a distortion of clamping elements 215, 216 and thus in a positive coupling of ring gear 210 with nuts 61 on cylindrical section 206.

Nut 61 is rotatably mounted, while being held against axial displacement, by means of an additional shoulder 218 and two thrust bearings 222 and 224, one interposed between nut 61 and joint plate 3 and the other between shoulder 218 and a shouldered ring 225 pushed over nut 61 and connected by at least one screw 226 with joint plate 3. Along the circumference of nut 61 and overlapping thrust bearing 224 engaging joint plate 3, there is provided a scale 230. Joint plate 3 carries a pointer 231 directed toward scale 230. Ring 225 is cut out at the position of pointer 231 to form a window 232 in such a way that a part of scale 230 is visible from the exterior.

Due to the arrangement shown in FIG. 5, it is possible always to keep ring gear 210 in mesh with the common driving element 62. For individual adjustment of the nuts 61, it is necessary only to loosen clamping screws 220, and thus clamping ring 219, so that the clamping elements 215 and 216 are also loosened. Subsequently, joint plate 3 can be displaced through a certain distance, in either a tightening or loosening sense, on thread 204 of its beam 4 by engaging a hooked wrench with one of the slots or grooves 207 in nut 61 and rotating the nut in the appropriate direction. The extent of rotation of the nut 61 can be read at any time on scale 230 opposite pointer 231. In case it is necessary again, after such a unilateral tightening of one or all beams 4, to tighten all beams 4, 4' and 4" equally, this no longer has to be done experimentally. By virtue of scale 230, it is readily possible, in view of the fact that a unilateral tightening never exceeds one complete revolution of a nut 61, to bring all the nuts into the same scale position with respect to pointer 231.

The construction of the device is very simple, the connection from the driven ring gear 210 to the nut 61 to be driven is extremely strong and yet easily disengageable, and the turning back from different nut positions on the beams to the same positions is always possible in a simple and accurate manner.

It will be clear that various modifications can be made with respect to the controls for the automatic shifting of the mold closing power as represented, for example, in FIGS. 3 and 4, without departing essentially from the spirit of the invention. As mentioned above, any electrical or mechanical control can be transformed logically into an equivalent electronic control. The same holds true for the transformation of an electrical control into a pneumatic or hydraulic control. In addition, it is not absolutely necessary to use limit switches to monitor the displacement. Equivalent, or in certain cases, even superior, monitoring devices can be used for this purpose, such as light barriers, electro-capacitative or electro-inductive devices, or, instead of electrical path monitoring elements, there can be used hydraulic, pneumatic or mechanical monitoring elements.

The shifting mechanism can consist, as mentioned above, of a chain gear, a gear drive, or a combination of both. Separate drives also can be provided for the individual nuts, and it is merely necessary to ascertain that synchronous shifting of all nuts to be driven is assured, which can be effected, in the case of electric motors, by electric signals, and in the case of hydraulic or pneumatic devices, by known pressure and flow rate systems.

The means connecting the ring gear with the nut can also be arranged as several pairs of ring clamping elements or a three-part ring clamping element, for example, where a clamping ring with sloping surfaces on both sides, in an axial direction, and clamping rings with sloping surfaces on only one side, arranged at both sides thereof, is used.

What is claimed is:

1. The method of operating a press, of the type including at least two mold parts arranged to be closed, to define a mold cavity, and opened relative to each other, relatively movable carrier plates each mounting a mold part, a toggle mechanism operable by a driving motor, having a maximum available driving power, to displace one carrier plate relative to a second carrier plate, a joint plate engaged with the toggle mechanism, beams extending on both sides of one carrier plate between the second carrier plate and the joint plate, and laterally of the carrier plate, the beams constituting tension members interconnecting the second carrier plate and the joint plate, and a shifting mechanism for adjusting the effective length of the beams between the second carrier plate and the joint plate: said method comprising the steps of setting a minimum peak driving power, less than said maximum available driving power, to be attained during closure of the mold, to establish a driving power range whose upper limit is said maximum available driving power and whose lower limit is said minimum peak driving power; during each cycle of opening and closing the mold, initiating closure of the mold with the mold parts moving along a closing path and with the beams having a preset length normally effective to assure complete closure of the mold parts; during the same closure of the mold, measuring the peak required driving power in a certain range of the closing path, in advance of the final closing of the mold and after the mold parts are in contact with each other; responsive to such measured peak required driving power being less than such driving power range, operating the shifting mechanism, during the same cycle, in a direction to reduce such effective length of the beams to increase the measured peak required power to a value within such driving power range; and, responsive to such measured peak required driving power exceeding such driving power range, operating the shifting mechanism, during the same cycle, in a direction to increase such effective length of the beams to decrease the measured peak required power toward such driving power range.

2. The method of operating a press, as claimed in claim 1, in which the magnitude of the adjustment in such effective length of the beams by said shifting mechanism is equal to the difference between such measured peak required driving power and the mean value of such driving power range.

3. The method of operating a press, as claimed in claim 1, including converting any deviation of such measured peak required driving power from such driving power range into a shifting signal; and utilizing the shifting signal to energize the shift mechanism to adjust such effective length of the beams in a direction to correct such deviation.

4. The method of operating a press, as claimed in claim 3, including controlling the energization of the shifting means by the shifting signal to limit the resulting adjustment of the measured peak required driving power to a value not greater than such driving power range; and, responsive to the measured peak require driving power attaining a value equal to the upper limit of such driving power range before the mold is closed, interrupting closing of the mold.

5. A method, as claimed in claim 1, in which the press is an injection molding machine for producing injection molded plastic workpieces.

6. A method, as claimed in claim 1, in which the press is a die casting machine for producing pressure cast metal workpieces.

References Cited
UNITED STATES PATENTS

| | | | |
|---|---|---|---|
| 3,579,741 | 5/1971 | Schwartz | 164—154 X |
| 3,423,502 | 1/1969 | Stimpson | 425—150 X |
| 3,628,561 | 12/1971 | Corbett | 425—149 X |
| 2,256,798 | 9/1941 | Yenkel | 425—447 X |
| 3,089,188 | 5/1963 | Hoffmann | 425—167 |

ROBERT F. WHITE, Primary Examiner
T. P. PAVELKKO, Assistant Examiner

U.S. Cl. X.R.

100—43, 50; 164—4, 153; 264—328; 425—135, 137, 149